W. Anderson,
Sprinkler.

No. 112,309. Patented Mar. 7, 1871.

Witnesses.
Geo. H. Strong,
Jno. L. Boone

Inventor.
William Anderson

UNITED STATES PATENT OFFICE.

WILLIAM ANDERSON, OF SAN FRANCISCO, CALIFORNIA.

IMPROVEMENT IN HOSE-SPRINKLERS.

Specification forming part of Letters Patent No. 112,309, dated March 7, 1871.

*To all whom it may concern:*

Be it known that I, WILLIAM ANDERSON, of the city and county of San Francisco, State of California, have invented an Improved Hose-Sprinkler; and I do hereby declare the following description and accompanying drawing are sufficient to enable any person skilled in the art or science to which it most nearly appertains to make and use my said invention or improvements without further invention or experiment.

My invention relates to an improved sprinkler to be attached to the end of garden and other hose, for the purpose of ejecting a spray or mist of water upon vegetation, and other purposes for which a spray is beneficial or useful; and it consists of three or more hollow curved arms attached to a central cylinder, which revolves upon the upper end of a vertical pipe, to which the hose is attached.

Holes are made at intervals through the vertical pipe, and they lie in the track of the openings in the curved arms, which allow the water to be forced out through the arms when the holes in the arms are opposite the holes in the vertical pipe, but cutting off the supply after the holes have passed each other, thus causing the water or spray to be distributed over a large surface of the ground.

In order to more fully illustrate and describe my invention, reference is had to the accompanying drawing, forming a part of this specification, in which—

Figure 1:
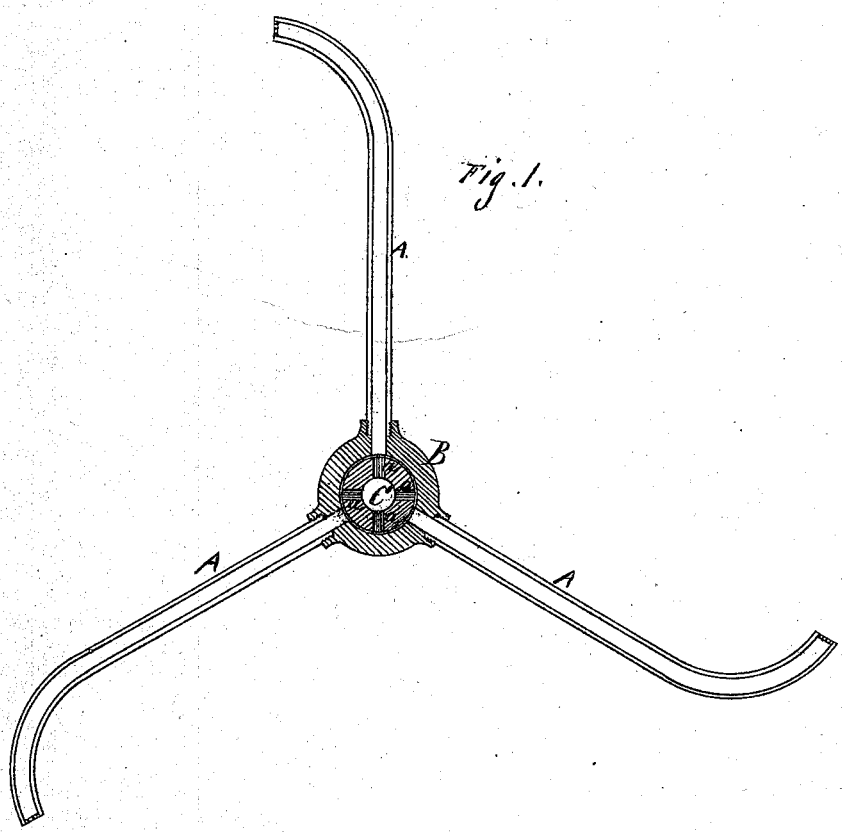
Figure 2:
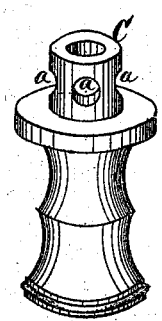

Figure 1 is a horizontal section of the sprinkler, taken through the arms. Fig. 2 is a view of the vertical hollow pipe, showing the holes.

A A A are three or more hollow curved arms, attached to a central revolving cylinder, B. The cylinder B is placed over the vertical hollow pipe or shaft C, so that it is easily revolved. The shaft C is provided with four or more holes, *a*, which lie in the track of the hollow arms, and which serve to conduct the water into them as they are brought opposite the holes *a* in their revolution. The sprinkler is rotated by the reaction of the water escaping at the ends of the hollow arms A in a direction the reverse of the escape, similar to Barker's reaction-mill.

The holes *a* serve to alternately cut off and let on the water into the arms, thus causing the water to be distributed from the point where the full force of the pressure in the shaft C carries the water to the center directly around the shaft, while in a reaction-mill, the force being equal at all times, the water is delivered in a continuous track. By the use of this device I have a continuous rotary sprinkler operated by the force of the water, and one which will give a regular and uniform distribution of the water upon the entire surface within the circle of its scope.

It will be perceived that this apparatus differs from the Barker wheel in this particular, that the flow of the Barker wheel is continuous, and differs from all basin and other two or many way cocks in its revolving character, and the horizontal curvature of its arms, from which this function is derived.

What I claim as my invention and improvement in the above-described sprinkler is—

The supplying-pivot with alternate holes and spaces, in combination with the rotating collar B, fitted to said pivot, with alternate holes and spaces, so as to cut off and renew the supply of water alternately as the collar revolves, and sprinkle the entire area within its reach around the pivot instead of a single track.

In witness whereof I have hereunto set my hand and seal.

WILLIAM ANDERSON. [L. S.]

Witnesses:
   GEO. H. STRONG,
   WM. GERLACH.